Patented Oct. 22, 1940

2,219,103

UNITED STATES PATENT OFFICE 2,219,103

PROCESS OF MANUFACTURING ALKALI AND AMMONIUM CHLOROSULPHONATES

Ralph K. Iler, Cleveland Heights, Ohio, assignor to E. I. du Pont de Nemours & Company, Wilmington, Del., a corporation of Delaware No Drawing. Application October 22, 1937, Serial No. 170,347

3 Claims. (Cl. 23—50)

This invention relates to the manufacture of chlorosulphonates, and is more particularly directed to processes for making sodium chlorosulphonate wherein sodium chloride is contacted with sulphur trioxide and subjected to attrition.

Sodium chlorosulphonate produced by reacting sodium chloride and sulphur trioxide is believed to have the formula $NaClSO_3$, but it may be made up of a mixture including sodium chloride, sodium chlorosulphonate, and sodium pyrochlorosulphonate ($NaClS_2O_6$) as well as a small amount of free $SO_3$ when first made.

Chlorosulphonates other than sodium chlorosulphonate such as, for instance, ammonium and potassium chlorosulphonates have a similar formula and structure.

I have found that a uniform, homogeneous product comprising chlorosulphonates may be prepared by reacting a chloride with sulphur trioxide while subjecting the chloride to attrition. More specifically, I have found that a uniform, homogeneous sodium chlorosulphonate may be made by a process wherein sodium chloride is contacted with sulphur trioxide and subjected to attrition.

The attrition of a chloride may be effected by the use of a ball mill, an edge roller mill or other such suitable equipment.

The reaction of sulphur trioxide on a chloride, according to my invention, should be carried out under such conditions as will permit successful attrition. The temperature at which the treatment is effected must not be too low or else the rate of sulphur trioxide condensation on the chloride so much exceeds the reaction rate that a pasty mass is formed. In general, attrition should not be conducted with temperatures substantially below about 30° C., while more particularly when manufacturing sodium chlorosulphonate or ammonium chlorosulphonate the temperature should not be allowed to go much below about 50° C.

Too high a temperature, similarly, should not be used because the amount of the condensed free sulphur trioxide in the salt mass will be decreased, thus slowing down the reaction, particularly in the manufacture of sodium chlorosulphonate.

In the manufacture of chlorosulphonates a temperature not substantially higher than about 80° C. should preferably be used, because above this temperature sulphur trioxide does not condense in the mass rapidly enough to enable the reaction to proceed with sufficient rapidity.

The temperatures should be maintained, moreover, below those at which the chlorides being treated become soft by the action of heat. For instance, with ammonium chloride a temperature not substantially higher than about 100° C. is for this reason preferred.

In the manufacture of sodium chlorosulphonate by reacting sulphur trioxide upon sodium chloride with attrition a temperature between about 50 and 60° C. is specifically preferable.

The reaction of sulphur trioxide on chlorides, according to my invention, is exothermic, and the temperatures at which the reaction is effected may readily be controlled in most instances by the rate of gas flow. Suitable heating or cooling means may be used as required.

The processes of my invention may be carried out as continuous or batch operations, depending upon the equipment available and the production desired. The sulphur trioxide content of the final product may be adjusted to a desired figure, discontinuing the operation when a desired composition is reached.

In the manufacture of chlorosulphonates according to my invention it is important that moisture or water in any form be kept out of contact with the reactance or the product, as otherwise the product will be decomposed in proportion to the amount of water present.

A typical sample of sodium chlorosulphonate made using attrition of sodium chloride had the following composition:

| | Per cent |
|---|---|
| Sodium chloride (NaCl) | 52.2 |
| Sulphur trioxide ($SO_3$) | 40.7 |
| Acid sodium sulphate ($NaHSO_4$) | 7.1 |

It will be understood that the exact relation between sodium chloride and the $SO_3$ is not known and that the compound may be a mixture of sodium chloride with sodium chlorosulphonate, or of sodium chloride with sodium pyrochlorosulphonate.

While, as has been pointed out heretofore, the processes of my invention are applicable generally to production of chlorosulphonates such as sodium, potassium, or ammonium chlorosulphonates, it will be understood that particularly good results have been obtained in the manufacture of sodium chlorosulphonate and ammonium chlorosulphonate.

While I have shown certain illustrative conditions it will be understood that without departing from the spirit of my invention one skilled in the art may employ various processes wherein a chloride such as sodium chloride is contacted with sulphur trioxide and subjected to attrition.

I claim:

1. In a process for the production of a chlorosulphonate, the steps comprising contacting a chloride with sulphur trioxide while subjecting it to attrition, the attrition being such as that effected by such devices as ball mills and edge runner mills and being effected at a temperature no lower than 30° C. and no higher than about 100° C.

2. In a process for the production of sodium chlorosulphonate, the steps comprising contacting sodium chloride with sulphur trioxide while subjecting it to attrition, the attrition being such as that effected by such devices as ball mills and edge runner mills and being effected at a temperature no lower than 30° C. and no higher than about 100° C.

3. In a process for the production of ammonium chlorosulphonate, the steps comprising contacting ammonium chloride with sulphur trioxide while subjecting it to attrition, the attrition being such as that effected by such devices as ball mills and edge runner mills and being effected at a temperature no lower than 30° C. and no higher than about 100° C.

RALPH K. ILER.